Dec. 31, 1940.   K. SCHLESINGER   2,227,000
TELEVISION TRANSMITTER
Filed Nov. 29, 1935
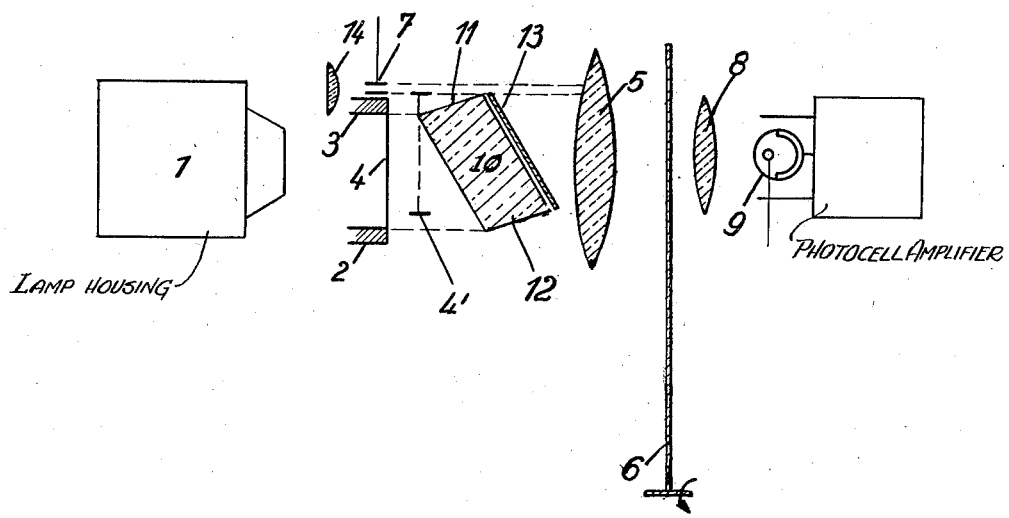
Inventor:

Patented Dec. 31, 1940

2,227,000

UNITED STATES PATENT OFFICE 2,227,000

TELEVISION TRANSMITTER

Kurt Schlesinger, Berlin, Germany, assignor, by mesne assignments, to Loewe Radio, Inc., a corporation of New York Application November 29, 1935, Serial No. 52,167
In Germany December 1, 1934

3 Claims. (Cl. 178—7.6)

The present invention describes a form of embodiment of a television transmitter having a perforated disc which produces the synchronising signals by means of the scanning apertures. The method itself, which is characterised by the fact that the scanning hole that has scanned the image area must subsequently thereto traverse a white marginal line, has already been described in the earlier application Ser. No. 45,729. The stated method is accompanied by the difficulty of inadequate light. It is not a simple matter to pass through the very small scanning hole a light of such amount that by means thereof the amplifier, as called for by the method, is completely blocked in the final stage. The present embodiment is distinguished by the fact that in the formation of the bright marginal line, the so-called starting line—so called because this line governs the commencement of a new scanning line in the receiver—light absorbent material of any kind is avoided.

The accompanying drawing shows a section through the optical system of a television transmitter of this kind viewed from above. From the lamp casing 1, which in the manner known per se contains an arc-lamp fitting with reflector and with or without a special condensing lens, the bundle of rays passes to the film-guiding means, which consist of two slides or guides 2 and 3 for the film 4. It falls on the lens 5 situated behind the film-guiding means, and the film is reproduced by this lens on the disc 6. For the purpose of producing a very white line a gap 7 is provided, in accordance with the invention, adjacent one slide 3. The size of this gap may also be made to be adjustable. As well known, the difficulty consists in disposing the reproduction of this gap immediately adjacent the edge of the film 4, i. e., in causing by optical means the disappearance of the intermediate spacing resulting from the wide film slides 3. These optical means, however, should in no way obstruct the passage of the light through the starting line gap 7, so that the greatest possible intensity of light in respect of this line can be generated on the Nipkow disc 6 and projected through a lens 8 on to the photo-cell 9. According to the invention, there is employed for this purpose a plano-parallel plate 10. This plate is disposed inclinedly towards the film in the manner shown in the drawing, but at the same time its vertical edges are exactly parallel to the film. The thickness of the plate and its inclination may readily be made such that the reproduction of the film 4' and the starting line 7 images are disposed immediately adjacent each other. The marginal portions of the plano-parallel plate 10, the edges of which are designated 11 and 12, are cut, in accordance with the invention, exactly parallel to the marginal rays of light passing through. In this manner it is avoided that the glass of 10 projects too far into the path of the light of the starting line 7. Upon the introduction of the thick plate 10 the film 4 is apparently displaced into a plane 4' which is situated closer to the lens, whereby at the same time it receives the desired displacement in the rays to the edge of the starting line 7. The plane of the diaphragm 7 accordingly requires to be displaced to the extent of a few millimetres behind the plane of the film 4, so that both will be reproduced sharply at the same time. The arrangement as described is the only one among several optically equivalent arrangements which will guarantee, even with low light intensities from 1, a reliable excitation of the photo-cell 9 in practical operation extending over a period of time. The absorption by the plate 10 causes the image potential to decrease as compared with the synchronisation potentials, in the manner which is necessary. The effect may be assisted by holding dark glasses 13 in front of the plate 10 at points which are not reproduced sharply simultaneously with the plane of the film.

A further increase in the density of light in the gap is conveniently obtained by means of a cylindrical lens 14 having a short focal distance held in front of the gap. In this connection the focal distance should be selected to be as small as just allowed by the divergence of the rays passing out beyond the diaphragm before the rays pass the lens 5. The lateral length of 14 may be exactly so large that no marginal shadows fall on the film 4. On the other hand the lens may be so wide that its shadow covers the entire film guide 3.

I claim:

1. In a television system for producing signals representing an image of which an electro-optical replica is to be produced and for also producing auxiliary signals for synthesizing the electro-optical reproduction, a film record strip having thereupon image representations upon the successive frames thereof, means to illuminate the film record strip and to direct light varied in intensity by the light values represented by the frames of said strip along a path substantially normal to the said strip, means for transmitting a relatively high intensity light beam along a path substantially parallel to the varied intensity light rays representing the image representations, an image receiving element to receive the light rays transmitted along each of the light paths, prismatic means for laterally shifting the light transmitted along one of said paths relative to the other to bring the light beams impinging upon the image receiving element into continguous relationship thereat, means to maintain the maximum image illumination of the light receiving element at a value less than that due to the said high intensity light beam, and means for scanning the light images at the plane of the image receiving element to produce signal energy.

2. In a television system for producing signals representing an image of which an electro-optical replica is to be produced and for also producing auxiliary signals for synthesizing the electro-optical reproduction, a film record strip having thereupon image representations upon the successive frames thereof, means to illuminate the film record strip and to direct light varied in intensity by the varying transparencies of the said film strip along a path substantially normal to the said strip, means for transmitting a relatively high intensity light beam along a path substantially parallel to the varied intensity light rays representing the film image, an image receiving element to receive the light rays transmitted along each of the light paths, prismatic means for laterally shifting the varied light rays relative to the high intensity light beam to bring each of the beams as impinging upon the image receiving element into contiguous relationship thereat, means to maintain the maximum image illumination of the light receiving element at a value less than that due to the high intensity light beam, and means for scanning the light images at the plane of the image receiving element to produce signal energy.

3. A television film transmission arrangement comprising a scanning disc, a photo-electric cell arranged in operative relationship thereto, means projecting an image of the object to be transmitted onto said scanning disc including a light source and a lens system, means for simultaneously projecting a light margin of great brightness onto the edge of said image projection, said disc having scanning holes being spacially displaced with respect to each other to such an extent as to obtain impinging of said photo-electric cell by the varying light intensity through only one of said holes during one complete line traverse of the image contents and said light margin adjacent to said line, said light margin being produced by the same light source as employed for the film reproduction, a plano-parallel plate being arranged between the film to be transmitted and said lens system as to project said film image laterally onto said light margin, a dark glass being arranged in front of said plano-parallel plate as to reduce the light intensity of the image projection.

KURT SCHLESINGER.